(12) United States Patent
Abbe

(10) Patent No.: US 10,742,700 B2
(45) Date of Patent: Aug. 11, 2020

(54) USER ASSEMBLED CONTENT DELIVERED IN A MEDIA STREAM

(71) Applicant: Leo T. Abbe, New York, NY (US)

(72) Inventor: Leo T. Abbe, New York, NY (US)

(*) Notice: Subject to any disclaimer, the term of this patent is extended or adjusted under 35 U.S.C. 154(b) by 0 days.

(21) Appl. No.: 15/192,324

(22) Filed: Jun. 24, 2016

(65) Prior Publication Data

US 2016/0381104 A1 Dec. 29, 2016

Related U.S. Application Data

(60) Provisional application No. 62/184,000, filed on Jun. 24, 2015.

(51) Int. Cl.
G06F 15/16 (2006.01)
H04L 29/06 (2006.01)
G06Q 30/02 (2012.01)

(52) U.S. Cl.
CPC ..... *H04L 65/4092* (2013.01); *G06Q 30/0277* (2013.01); *H04L 65/4076* (2013.01); *H04L 65/602* (2013.01)

(58) Field of Classification Search
CPC .......... H04L 65/4076; H04L 65/4092; H04L 65/602; G06Q 30/0277
See application file for complete search history.

(56) References Cited

U.S. PATENT DOCUMENTS

| | | | | |
|---|---|---|---|---|
| 6,581,103 B1* | 6/2003 | Dengler | ............... | H04L 29/06 709/219 |
| 2002/0032752 A1* | 3/2002 | Gold | ............... | G06Q 30/02 709/218 |
| 2011/0112921 A1* | 5/2011 | Kennewick | ........ | G06Q 30/0601 705/26.1 |
| 2013/0132230 A1* | 5/2013 | Gibson | ............. | G06Q 30/0627 709/219 |
| 2013/0263182 A1* | 10/2013 | Ivy | ...................... | H04N 21/458 725/34 |
| 2013/0291079 A1* | 10/2013 | Lowe | ...................... | G06F 21/00 726/7 |
| 2014/0280773 A1* | 9/2014 | Sharp | ................. | H04L 65/4084 709/219 |
| 2015/0294342 A1* | 10/2015 | Hertel | ............... | G06Q 30/0226 705/14.27 |

* cited by examiner

*Primary Examiner* — Suraj M Joshi
*Assistant Examiner* — Ayele F Woldemariam
(74) *Attorney, Agent, or Firm* — Cozen O'Connor

(57) ABSTRACT

A system and method for a user to send a message to another user of a streaming media service. The message is directed to a specific recipient and is sponsored by an advertising entity. The shout-out is transmitted to the recipient with a sponsor message when the recipient either accesses or logs into the streaming media service. The recipient is notified that a shout-out or dedication is available for the recipient to listen to. When the user logs into the streaming media service the shout-out is presented to the recipient along with a sponsor advertisement.

18 Claims, 3 Drawing Sheets

USER ASSEMBLED CONTENT DELIVERED IN A MEDIA STREAM

RELATED APPLICATIONS

This application claims priority from U.S. Provisional Patent Application Ser. No. 62/184,000 which was filed on Jun. 24, 2015.

FIELD OF THE INVENTION

The present invention relates to streaming media and more particularly to providing targeted message content to a user via a streaming media service along with the streaming media delivered by the streaming media service.

BACKGROUND

Currently, a radio listener, identified as a user, is able to call or text a radio station or a specific DJ and request a song. Along with or instead of the song request, the listener can send a message, referred to as a shout-out, to another listener. The user must rely on the DJ to actually play the request or air the shout-out. Unless the user for whom the dedication was made or who was the target of the shout-out happens to be listening to a radio, and the particular station when the request or shout-out is aired, the listener will never know that the dedication was made or a special message sent.

SUMMARY OF THE INVENTION

With listeners migrating to streaming media services, there is no way to send a shout-out or dedicate songs to particular listeners. What is needed is a system and method to enable users to send messages and/or dedicate songs to another user using a streaming media service. Additionally, what is needed is a way to subsidize these shout-outs or dedications, preferably by sponsors, and more particularly by advertising sponsors.

According to the one embodiment of the present invention, a user is able to send a shout-out to another user of a streaming media service. The shout-out is directed to a specific recipient and is sponsored by an advertising entity. The shout-out is transmitted to the recipient with a sponsor message when the recipient either accesses or logs into the streaming media service. In one embodiment, the recipient is notified that a shout-out or dedication is available for the recipient to listen to. When the user logs into the streaming media service the shout-out is presented to the recipient along with a sponsor advertisement.

Accordingly to one embodiment of the invention, each user has an App that links with one or more streaming media services. In one embodiment, each streaming media service has a dedicated App. To send a dedication or shout-out, a user records a shout-out and/or selects a song for the dedication. Next, the user selects a sponsor. Finally, the dedication or shout with a message from the selected sponsor are presented to the recipient.

In one embodiment, user generated shout-outs become part of a recipient's media stream without a sponsor message. The user creates the shout-out and sends it to the recipient without selecting a sponsor. In one embodiment, the user is able to opt out of including a sponsor message.

According to one aspect of the invention additional content in a media stream is provided by receiving at a server a selection of a recipient from a remote device, receiving at the server content from the remote device, selecting a sponsor for the additional content, generating at the server the additional content by combining one or more of an identifier of the recipient, the content, and an identifier of the sponsor, and transmitting the additional content to a media stream server for delivery to the recipient.

According to one aspect of the invention, the recipient is notified that there is additional content available for receipt.

According to one aspect of the invention, instructions are provided to the media stream server to delay providing the media stream until the additional content is transmitted to the recipient.

According to one aspect of the invention, the content from the remote device is received via one of text, email, voice, and fax.

According to one aspect of the invention, the content is one of received in a format that can be analyzed by the server and converted to the format that can be analyzed by the server.

According to one aspect of the invention, at least one of the remote device and a user of the remote device is authenticated.

According to one aspect of the invention, the authentication of the one of the remote device and a user of the remote device is via one of a PIN and biometric data.

According to one aspect of the invention, a user of the remote device selects the sponsor for the additional content.

According to one aspect of the invention, the additional content is analyzed for content and the sponsor for the additional content is selected based at least in part on the content.

According to one aspect of the invention, the sponsor is selected based at least in part on a minimum quantity of additional content that the sponsor will sponsor.

According to one aspect of the invention, the server determines if a recipient has opted out of receiving a sponsor message.

According to one aspect of the invention, the content is analyzed for inappropriate content; and either a warning is provided to the remote device that the content is inappropriate and at least one of the mobile device and a user of the mobile device is blocked from providing content.

According to one aspect of the invention, the sponsor is selected based at least in part on one or more of specific keywords, selected demographic groups, zip code, and a budget.

According to one aspect of the invention, the additional content is provided to a plurality of listeners in addition to the recipient.

One aspect of the invention is a system configured to provide additional content in a media stream comprising. The system includes a remote device, a server configured to: receive a selection of a recipient from the remote device, receive content from the remote device, generate the additional content by combining one or more of an identifier of the recipient, the content, and an identifier of a sponsor, and select a sponsor for the additional content. The system also includes a media stream server configured to receive the additional content and transmit the additional content to the recipient.

DETAILED DESCRIPTION

Figure 1:
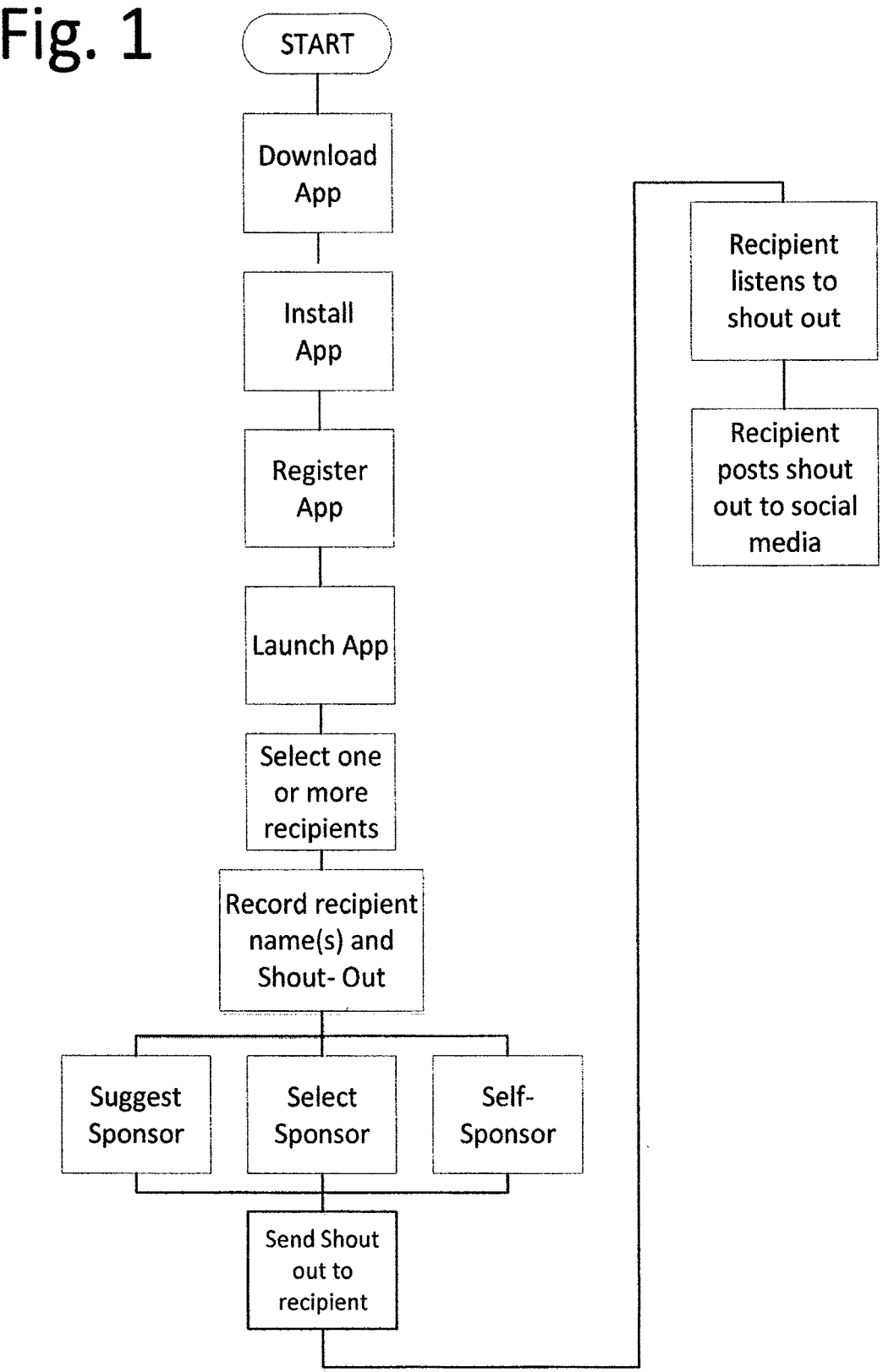
FIG. 1 is a flowchart of the method.

Initially, the App is downloaded to a user device such as a Smart Phone or the like. Alternatively, the App can be downloaded to a personal computer. Once the App is downloaded and installed the user preferably registers an account. In one embodiment, the user must register an account. Registration provides accountability to ensure appropriate content for shout-outs. One way in which a user can be registered is to provide a mobile number that is verified with a text message containing a unique code. The unique code is then entered in the App to verify the user. Alternatively, a PIN can be sent via mail or another verifiable method.

During the registration process users provide demographic data that will be used to match users with advertising sponsors for both sending and receiving shout-outs. The demographic data may also be used to disseminate shout-outs to a group as discussed below. The demographic data that is collected includes date of birth, gender, zip code, education, hobbies, skills, and the like. An email address is also preferably provided by the user during the registration process. In one embodiment, an email must be provided. Additionally, during the registration process, a user enters their user name and password for the streaming media services to which they subscribe. In one embodiment, the App accesses a user's contacts to generate a list of potential shout-out and/or dedication receivers. Additionally, when the shout-out initiator is sending a shout-out to someone that is not a contact, a specific email address can be entered.

When a user decides to send a shout-out or make a dedication, the user launches the App. The App can be launched independently or from within the streaming media service. The first step once the App is launched is to select a recipient for the shout-out. One or more recipients for the shout-out can be selected either from the previously entered contact list or one or more newly entered recipients. Preferably, as new shout-out recipients are entered they are stored in the user's contact list. If the recipient is already a contact, the user can use a name or a nickname to select the recipient. It should be noted that because most streaming services require registration by email, an email address can be used to find the recipient subscribing to a particular streaming service.

In one embodiment, the App is tied to a specific streaming service. Alternatively, the App can be tied to a central server that interacts with the various streaming services either directly or via the Internet to determine to which streaming service a shout-out recipient subscribes. In this manner, shout-outs could be sent out across various platforms to multiple users.

Once the user selects a recipient or group of recipients the user is prompted to record the name of the recipient and the shout-out. The user is given an opportunity to listen to and accept the recorded shout-out. If the user is not satisfied with the shout-out, the shout-out can be re-recorded. Voice recognition software is used to analyze the shout-out for prohibited words and advertiser selected search words. In one embodiment, the shout-out has a predetermined duration, such as 10 seconds. Once the user accepts the shout-out the user selects a sponsor for the shout-out. In a preferred embodiment, the App will present the user with a list of sponsors from which the user selects a single sponsor. The sponsor list is generated based on the demographic information the user initially entered during registration process. Additionally, sponsors may be suggested based on the demographic data of the recipient, if known, or usage patterns of the user. Still further, the sponsor list can be generated based on the content of the shout-out.

If the user has a particular sponsor in mind that does not appear in the suggested list, the user can search for that sponsor. If the desired sponsor is not present in the list, or if the user wants to use a non-participating sponsor, the user can input the sponsor information. The sponsor information would include name, address, telephone number, email contact information, and the like. If a non-participating sponsor is entered by a user, the system will advise the user if the sponsor is not currently available. The system will then inform the nonparticipating sponsor that a user would like them to sponsor a shout-out. The App administrators can then attempt to engage this entity as an advertising sponsor. If the nonparticipating sponsor becomes a participating sponsor, the user is notified that the sponsor has signed onto to the service.

In one embodiment, if the User suggested a non-participating sponsor, the system sends a mock shout-out file and the contact info provided to the lead generation team, who then seek out the potential sponsor and sell them on the service.

After the shout-out is recorded and the sponsor is selected the user selects a date and time range during which the shout-out should be delivered. In one embodiment, the streaming service or app notifies the user when the recipient typically logs into the streaming service. The system sends the full shout-out audio file, which includes the sponsor message, to the various streaming services along with the recipient's email in order to create a handshake. The file that the streaming service receives preferably includes the user selected delivery date and time. In one embodiment, the system provides a budget to the various streaming services so that they know how many ad runs to play against other "similar" listeners in a particular geographic or demographic group of the recipient. The services have this information as a result of their registration process.

When a streaming service runs the shout-out or dedication for a recipient, the streaming service immediately notifies the system, so as to avoid redundant runs amongst the other services. Further, as a streaming media service runs the ad against other "similars" the streaming media services also provide real time information so that a sponsor's budget is reflected on a real time basis to all the streaming services.

In one embodiment, if the recipient has not logged into the streaming service by the end of the time range the user entered, an alert is sent to the recipient either by email or text notifying them that a shout-out has been sent to them. Alternatively, when the user sends the recipient a shout-out the recipient is notified by text, email, or the like, that a shout-out is waiting for them. However, a notification to the user eliminates the element of surprise for the recipient when they hear the shout-out or dedication on the streaming service. The alert email or text message can include a link to log into the streaming service. If the email or mobile number used to provide the alert message is not the email or mobile number used for the streaming service, the recipient is given the opportunity to log into the streaming service with their registered account information. Preferably, this information is stored by the App so that future shout-outs are linked to the appropriate streaming media account. Alternatively, the recipient is given the opportunity to register with the steaming media service. The linking can be done by cookies, a database stored on a server, or the like.

If the recipient does not have a streaming service account, when the notification alert link is accessed, the recipient is given the opportunity to register with the streaming service. Once registered, the recipient would hear the shout-out and sponsored ad. A typical shout-out would be "happy birthday Jane from your friend Sue, sponsored by your friends at Sponsor." The "happy birthday Jane from your friend Sue" portion of the shout-out is preferably recorded by Sue. Alternatively, the shout-out can be typed and read by a generated voice.

It should be noted that in one embodiment, if a recipient signs up with a streaming service a referral fee is earned by the App provider for referring a new user to the streaming service.

If the recipient does not have the App, when the recipient receives the above email they are given the opportunity to download the App. In one embodiment, the email includes a radio button allowing the recipient to send a thank you response to the initial sender. This email as noted above will also include a link to download the shout-out App as well as the App for the streaming service. The App also has a provision to send a thank you to the sender of the shout-out.

In a preferred embodiment, the App includes links to social media services so that once the recipient listens to the shout-out the shout-out can be posted to a social media network or shared with friends via text, email, and the like. Preferably, the App tracks when a recipient posts the shout-out to a social media site. The App would also include an alert to report inappropriate or abusive shout-outs.

In one embodiment, the user may select a specific song to be dedicated to the recipient. The sponsor ad, shout-out, and song would then be delivered to the recipient. The dedicated song can be selected from a list or specifically designated by the user.

In one embodiment, the shout-outs are sent by sponsors. The sponsor selects a target demographic audience and sends a shout-out with their ad to matching recipients. If the App is on an iPhone or Android Platform, the budget for the shout-outs can be an in-App purchase. Alternatively, the sponsor is prompted to provide credit card or bank transfer information for billing purchases. The budget for sponsored shout-outs comprises the cost of the recipient to play the link as well as other advertising and operating costs.

In one embodiment, the sender is the sponsor and the sender decides their budget. If the app is on an iPhone, the budget is treated as an in-app purchase, if not, the sender is prompted to provide credit card or banking information. A budget consists of the cost of recipient play plus all plays in selected demographics or geographic regions.

On the system side of the App, sponsors can download a sponsor App that allows them to manage their sponsor campaigns. The sponsor App allows the sponsor to upload an audio file or create one on demand. When a sponsor initially downloads and activates the sponsor App they enter identifying information as well as credit card or banking information to pay for the sponsor campaigns. The App allows sponsors to create ad campaigns that include targeted demographic audiences, budgets, and specific budgets for targeted campaigns such as a campaign in a specific zip code, to a particular age group, or the like. It should be noted that multiple ad campaigns with multiple different ads can be prepared and presented simultaneously. Multiple different ads or targeted ads prepared for target audiences.

Sponsors can also register as ready and willing sponsors (RAW Sponsor). As a Raw Sponsor the sponsor can be listed as a potential sponsor and if chosen, the sponsor can hear the proposed shout-out and decide whether to use a canned ad or one of a plurality of prepared ads, or create an ad specifically for the recipient or recipient group. In addition, as a RAW Sponsor, the sender recorded name of recipient can be overridden and instead, the recorded name can be incorporate into their ad, using the Sender recording as a guide for pronunciation. For example, instead of the standard shout-out, the RAW sponsor shout-out may be "Sponsor wishes Jane a happy birthday from your friend Sue." Portions of Sue's recording would be used to create the RAW shout-out.

There will also be a portal website that gives them the ability to monitor real time progress of their campaigns. They can see the number of campaigns running, their used and unused budget per campaign, the number of times the ad was posted to social networks or shared with friends, the number of times the ad was played on social networks, etc. They can re-allocate unused ad budgets in real time.

Figure 2:
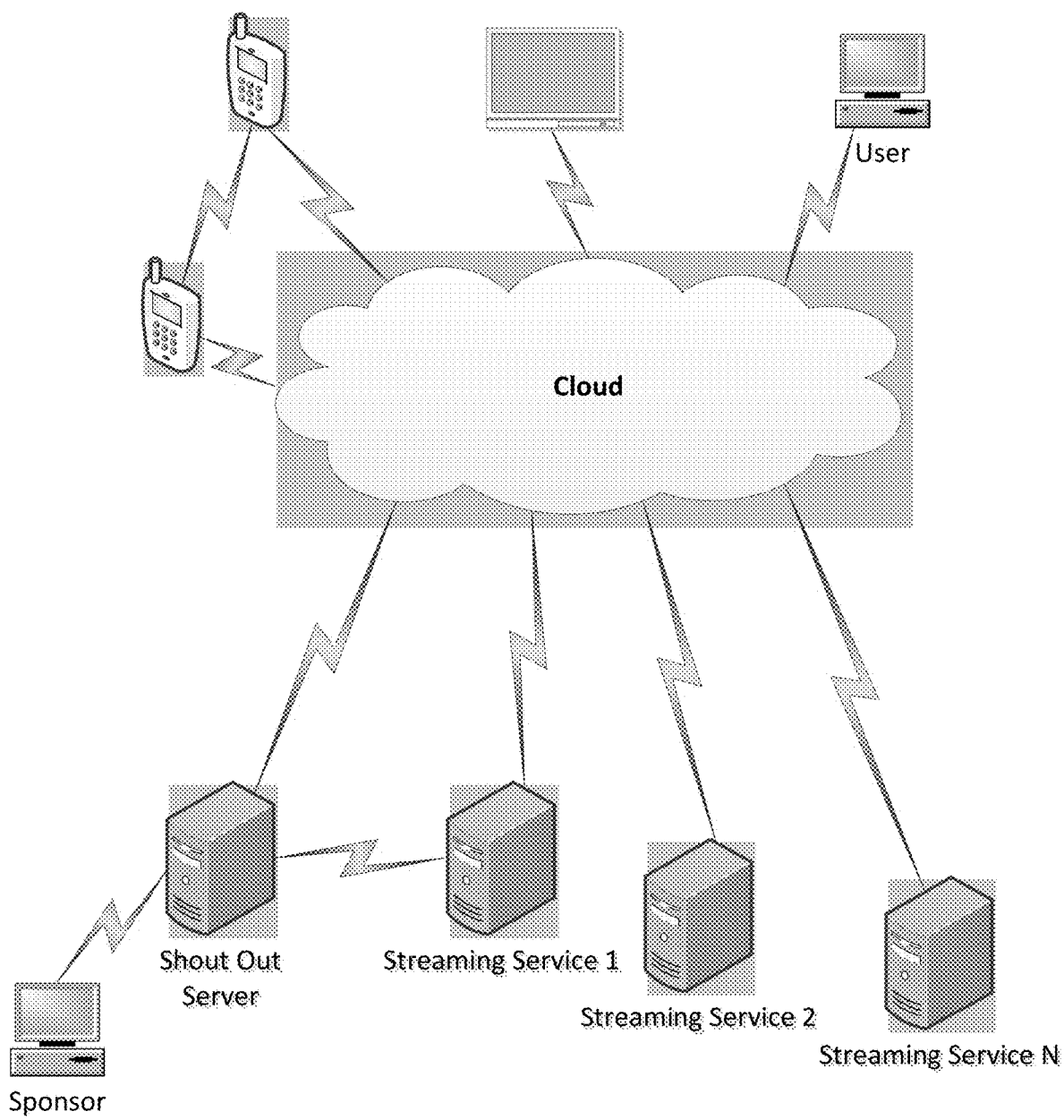
FIG. 2 is a depiction of the system.

As shown in FIG. 2, users can access the system from smartphones, laptop computers, personal computers, or the like. In one embodiment, shout-outs notifications are delivered directly to a recipient from a user. The recipient then retrieves the shout-out from the streaming service with a report delivered to the shout-out server. Alternatively, the shout-out is delivered directly to a recipient from a user. The recipient then provides a notification to the shout-out server when the shout-out is accessed.

Figure 3:
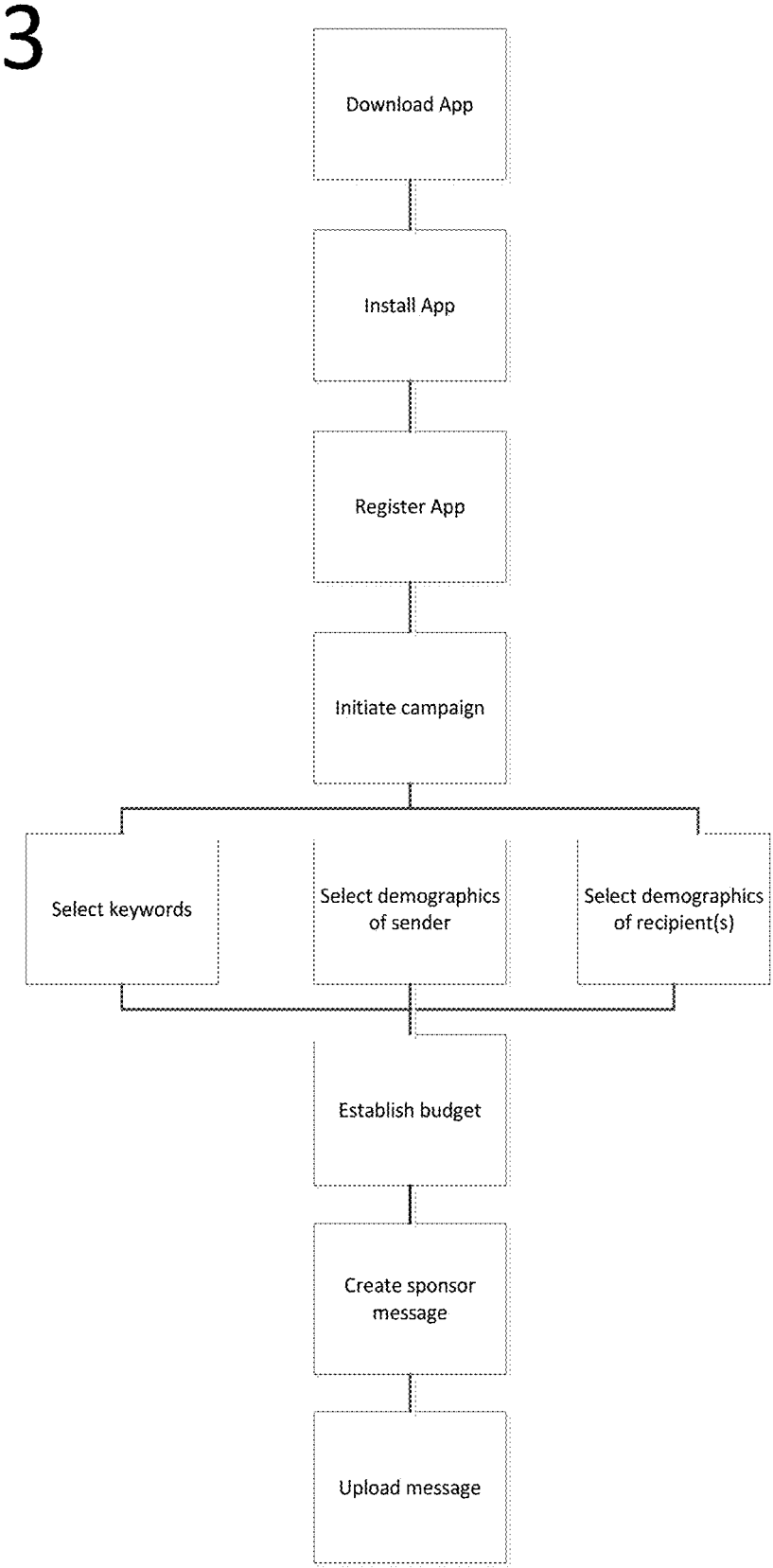
FIG. 3 is a flowchart of the method.

As shown in FIG. 3, a sponsor downloads and installs an app. Preferably, the app is specifically tailored for sponsors. Alternatively, the same app is used by sponsors and shout-out senders and recipients. The sponsors register so that they can sponsor shout-outs. Registration includes providing billing information, contact information, and the like. Once registered, a sponsor can initiate a campaign. A campaign relates to sponsoring shout-outs related to specific keywords, selected demographic groups, and the like. For example, a sponsor can elect to sponsor shout outs that have the word "birthday" or a sponsor can send a shout-out to a specific demographic group such as the high school graduating class in a specific zip code. A sponsor then establishes a target budget for a campaign. Each sponsored shout-out has a cost associated with it. The budget establishes how many shout-outs a sponsor will be affiliated with. The sponsor then creates a sponsor message and uploads it for dissemination to the shout-out recipients. It should be noted that the steps in establishing a campaign can be performed in any order. As sponsored shout-outs are sent to recipients, the sponsors are updated. In this way, sponsors can vary their budget, message, or the like.

In one embodiment, advertisements or sponsors for "shout out" messages are selected or determined based on specific contextual content of a message. For example, a user's "shout out" message can be happy birthday, happy Valentine's day, congratulations on your game, happy anniversary, or the like. The message is initially transcribed at a server. In one embodiment, after the "shout out" message is transcribed, the message content is compared to a go/no-go list. The go/no go list screens the message for inappropriate or offensive content. A contextual analysis of the message is also performed to target contextual meanings in the "shout out" message. The contextual analysis matches sponsors and advertisements that are delivered to the ultimate message recipient and any others who will hear the message.

In one embodiment, access to the application is limited by a PIN. The user must enter the PIN to access the functionality of the application. The PIN can be selected during initial set-up of the application or at a future time during use. In one embodiment, the PIN is verified by the Shout Out Server. Additionally, the PIN can authenticate a user to the Shout Out Server and/or Streaming Service. If the authentication using the PIN fails, the application can be terminated remotely by the Shout Out Server.

The application is configured to be terminated remotely. If the user violated a policy of if the authentication fails, the user's access to the application is blocked.

The delivered advertisement that is targeted to a third party, the "shout out" recipient, is based on input from a first party, the user. In this manner, it is not merely the words in the message that results in the delivered advertisement, but the contextual meaning of the message. For example, the context of the message may be an anniversary, but the user may not use the word anniversary. In this manner, advertisers select message keywords as well as contextual elements for which they want to advertise.

In one embodiment, the user selects a recipient and provides a "shout out" message. While the user preferably records the "shout out" a prerecorded "shout out" message may be used. Alternatively, a user can select a category for the "shout out" message such as birthday and suggested messages are displayed that the user can read and record. Advertisers select messages with which they want to include their advertisement that will be presented to recipients and others. The selection is based on keywords in the message, contextual analysis of the message, or a combination of contextual analysis and keywords. Once the message and advertisement are matched and the "shout out" message is prepared, the "shout out" message is presented to the recipient, as well as others that may or may not have a social connection to the recipient, and who may or may not be anticipating the play of the "Shout Out".

In one embodiment, the User does not select a sponsor, but rather the sponsor is chosen by information from the Shout Out gleaned by an ad server, which is a part of the Shout Out Server or another server. The shout out is contextually analyzed for key words or ideas and an ad is selected based on the context of the user's message. In other words, for contextual advertising the user would not need to select the sponsor. The system adapts depending on how the user enters the shout out. If the shout out is entered textually, by fax, email, text, or the like, an OCR function or equivalent is performed to convert the text into a form that can be analyzed by the ad server. If the shout out is entered by voice, for example over the phone, a speech to text conversion is performed.

In one embodiment, users are not given a choice of radio station or streaming service. A specific station or streaming service is provided for the "shout out" message. The recipient will receive a communication, email, text message, voice message, or the like informing the recipient to listen to the radio station or streaming service for a message. Alternatively, the user is allowed to select the radio station or streaming service.

In one embodiment, the delivered message will have a lead-in, which is preferably a musical lead-in. Next, the phrase "shout out" will be heard, and then the message will be played. Finally, the sponsor portion will be played, which includes "brought to you by" then the keyword advertisement.

In one embodiment, there is a small business feature, although this feature can be used for any advertiser. A small business will register with the "shout out" service. A short advertisement, typically 6-8 seconds is prepared. The business elects to have their advertisement played for recipients in, for example, a specific zip code. The small business provides a budget and the advertisement is played until the budget is exhausted. While presented as geographically based, the advertisements can be contextual as well, with or without a geographic component. In this manner a business can promote itself to local users or a small business can present a niche product to a broader market.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method of providing additional content in a media stream comprising:
   receiving at a server a user authentication;
   receiving at the server a selection of a recipient from a remote device of the user, after user authentication;
   receiving at the server audio content from the remote device of the user;
   selecting a sponsor for the additional content based at least in part on the content from the remote device determined by a contextual analysis of the audio content;
   generating at the server the additional content by combining one or more of an identifier of the recipient, the audio content, and an identifier of the sponsor;
   automatically transmitting the additional content to a media stream server for delivery to the recipient in the media stream;
   automatically transmitting the additional content to the recipient in the media stream with media stream content after recipient authentication by the media stream server;
   notifying the sponsor when the additional content is transmitted to the recipient,
   wherein the additional content is unrelated to the media stream content; and
   analyzing the content for inappropriate content;
   one of:
      providing a warning to the remote device that the content is inappropriate and
      blocking at least one of the mobile device and a user of the mobile device from providing content; and
   providing a notification to the user that generated the content and a notification from the streaming service to avoid redundant transmission of the additional content to the recipient in the media stream with media stream content after recipient authentication by the media stream server.

2. The method of claim 1, further comprising:
   notifying the recipient that there is additional content available for receipt.

3. The method of claim 1, further comprising:
   providing an instruction to the media stream server to delay providing the media stream until the additional content is transmitted to the recipient.

4. The method of claim 1, wherein the content from the remote device is received via one of text, email, voice, and fax.

5. The method of claim 4, wherein the content is one of received in a format that can be analyzed by the server and converted to the format that can be analyzed by the server.

6. The method of claim 1, wherein the user authentication comprises:
authenticating one of the remote device and a user of the remote device.

7. The method of claim 6, wherein the authentication of the one of the remote device and a user of the remote device is via one of a PIN and biometric data.

8. The method of claim 1, wherein a user of the remote device selects the sponsor for the additional content.

9. The method of claim 1, wherein the additional content is analyzed for content and the sponsor for the additional content is selected based at least in part on the content.

10. The method of claim 9, wherein the sponsor is selected based at least in part on a minimum quantity of additional content that the sponsor will sponsor.

11. The method of claim 1, wherein the server determines if a recipient has opted out of receiving a sponsor message.

12. The method of claim 1, wherein the sponsor is selected based at least in part on one or more of specific keywords, selected demographic groups, zip code, and a budget.

13. The method of claim 1, wherein the additional content is provided to a plurality of listeners in addition to the recipient.

14. A system configured to provide additional content in a media stream comprising:
a remote device;
a server configured to:
receive at a server a user authentication;
receive a selection of a recipient from the remote device of the user, after user authentication;
receive audio content from the remote device of the user;
generate the additional content by combining one or more of an identifier of the recipient, the audio content, and an identifier of a sponsor;
select a sponsor for the additional content based at least in part on the content from the remote device determined by a contextual analysis of the content; and
a media stream server configured to:
receive the additional content;
automatically transmit the additional content to the recipient in the media stream with media stream content after user authentication by the media stream server; and
notify the sponsor that the recipient has accessed the additional content upon transmitting the additional content to the recipient,
wherein the additional content is unrelated to the media stream content;
analyzing the content for inappropriate content;
one of:
providing a warning to the remote device that the content is inappropriate and
blocking at least one of the mobile device and a user of the mobile device from providing content; and
providing a notification to the user that generated the content and a notification from the streaming service to avoid redundant transmission of the additional content to the recipient in the media stream with media stream content after recipient authentication by the media stream server.

15. The method of claim 1, further comprising:
verifying that the additional content is provided by a single media stream provider.

16. The method of claim 1, further comprising:
notifying the additional content provider that the user has accessed the additional content.

17. The method of claim 1, wherein the transmitting the additional content is an overlay to the media stream for simultaneously listening to the additional content and the media stream.

18. The method of claim 1, wherein the transmitting the additional content is provided on demand.

* * * * *